US007403098B2

(12) United States Patent
Watkins et al.

(10) Patent No.: US 7,403,098 B2
(45) Date of Patent: Jul. 22, 2008

(54) METHOD AND SYSTEM FOR DEPLOYING DISASTER ALERTS IN A MOBILE VEHICLE COMMUNICATION SYSTEM

(75) Inventors: Gary A. Watkins, Royal Oak, MI (US); Jie Song, Troy, MI (US); Nebojsa Nedeljkovic, Birmingham, MI (US); Dwayne A. Crocker, Auburn Hills, MI (US); Christine E. Meissner, Royal Oak, MI (US)

(73) Assignee: General Motors Corporation, Detroit, MI (US)

( * ) Notice: Subject to any disclaimer, the term of this patent is extended or adjusted under 35 U.S.C. 154(b) by 232 days.

(21) Appl. No.: 11/142,778

(22) Filed: Jun. 1, 2005

(65) Prior Publication Data

US 2006/0273884 A1 Dec. 7, 2006

(51) Int. Cl.
*B60Q 1/00* (2006.01)
*G01W 1/00* (2006.01)
*G08G 1/16* (2006.01)
*G08G 1/08* (2006.01)

(52) U.S. Cl. .................... 340/425.5; 340/601; 340/901; 340/905

(58) Field of Classification Search ....................... None
See application file for complete search history.

(56) References Cited

U.S. PATENT DOCUMENTS 6,169,476 B1 * 1/2001 Flanagan ............... 340/286.02
6,603,405 B2 * 8/2003 Smith ......................... 340/905
6,845,324 B2 * 1/2005 Smith ............................ 702/3
7,084,775 B1 * 8/2006 Smith ......................... 340/601
2002/0004705 A1 * 1/2002 Baron et al. ................... 702/3
2002/0067289 A1 * 6/2002 Smith ......................... 340/905
2004/0181340 A1 * 9/2004 Smith ............................ 702/3
2006/0267783 A1 * 11/2006 Smith ......................... 340/601
2007/0049260 A1 * 3/2007 Yuhara et al. ............ 455/414.3

OTHER PUBLICATIONS

U.S. Appl. No. 11/142,715, filed Jun. 1, 2005, Tretyak, et al.

Kelly Carroll, Data to ride shotgun: InfoMove helps connect cars to Internet, Telephony Dec. 13, 1999, Copyright 1999 by PRIMEDIA Business Magazines & Media Inc., "All Rights Reserved", Telephony, Spectrum; ISSN: 0040-2656, 1091 words.

Seattle, InfoMove Delivers New Generation of Wireless Internet Services for the Car, Bursiness Wire, Oct. 18, 1999, Copyright 1999 Business Wire, Inc. Business Wire, Business Editors/Technology Writers, 994 words.

Bob Low, Motoring in the new millennium on the Net, Daily Record, May 1, 1998, Copyright 1998 Scottish Daily Record & Sunday Mail Ltd., Daily Record May 1, 1998, Friday, p. 31 Road, 734 words.

(Continued)

*Primary Examiner*—Julie Lieu

(57) ABSTRACT

One aspect of the invention provides a method of deploying disaster alerts to a mobile vehicle. The method includes determining disaster area coordinates of a disaster area and calculating buffer coordinates of a buffer region based on the disaster area coordinates. The method further describes a vehicle circle based on a radius of at least one location coordinate of the mobile vehicle and compares the vehicle circle with the buffer region coordinates. The disaster area coordinates are compared with the vehicle circle. The method then deploys at least one disaster alert based on the comparison of the vehicle circle and buffer region coordinates and disaster area coordinates.

20 Claims, 10 Drawing Sheets

OTHER PUBLICATIONS

Tarre Beach, New Products; Sidebar, Wireless Review Apr. 1, 2000, Copyright 2000 by PRIMEDIA Business Magazines & Media Inc., "All rights Reserved" Wireless Review, Apr. 1, 2000, New Products; ISSN: 1099-9248, 351 words.

Flint, Mich., Jan.3, BUIC XP2000—A Concept Cat For The 21st Century, PR Newswire, Jan. 3, 1995, Copyright 1995 PR Newswire Association, Inc. PR Newswire, Jan. 3, 1995, Tuesday, Financial News, (With Photo) To Business and Auto Editors, 2149 words.

* cited by examiner

260

260

METHOD AND SYSTEM FOR DEPLOYING DISASTER ALERTS IN A MOBILE VEHICLE COMMUNICATION SYSTEM

FIELD OF THE INVENTION

This invention relates generally to the management of alerts in a mobile vehicle communication system. More specifically, the invention relates to a method and system for deploying disaster alerts to one or more mobile vehicles in a disaster or crisis region.

BACKGROUND OF THE INVENTION

In a mobile vehicle communication system, a user occasionally needs to be alerted regarding natural disasters or crises that could impact upon the mobile vehicle being operated by the user. Such natural disasters or crises include floods, earthquakes or hurricanes. Other crises include large-scale traffic accidents or civil crises. The regions surrounding these crises are generally demarcated by government agency and the GPS coordinates for these regions are made available to the mobile vehicle communication system.

A particular disaster may span a finite or indeterminate amount of time. For example, a disaster alert such as a hurricane warning may be posted, alerting residents in the projected path of the hurricane to evacuate. The hurricane makes landfall, and potentially creates a disaster area. The disaster and its accompanying disaster alert may span the hurricane warning, landfall, and any clean up or recovery period following the land fall.

Currently disaster alerts typically come to all users, for example, over a vehicle's radio, but are not targeted specifically to users who are in or are nearing the disaster region. Moreover, if the user has the radio off, s/he will not hear the alert. Current disaster alerts tell, for example, what the disaster is and where the disaster is taking place. The alerts include warnings not to enter the disaster area or warnings what to do if in the disaster area.

It would be particularly desirable during a generalized disaster alert to target alerts to vehicles that are already in the region and even more desirable to pinpoint and alert vehicles that are nearing the region and could be turned away from it by a well-timed, pinpoint alert. It is also desirable to play the disaster alert to the user regardless of the status of independent features (i.e., the alert will play even if the radio is off). Additionally, it would be desirable to provide a disaster alert to vehicles without compromising the user's privacy by constantly tracking the locations of the vehicles. Moreover, it would be desirable to provide a disaster alert while keeping data transmission costs down (i.e. generalized disaster alerts to all vehicles will require more data transmission costs than disaster alerts pinpointed to fewer, specific vehicles).

Accordingly, it would be desirable to have a system and method for deploying disaster alerts so that they are targeted to vehicles in or near the disaster region. It is an object of this invention, therefore, to provide a method for deploying disaster alerts in a mobile vehicle communication system, and to overcome the obstacles described above.

SUMMARY OF THE INVENTION

One aspect of the present invention provides a method of deploying disaster alerts to a mobile vehicle. The method includes determining disaster area coordinates of a disaster area and calculating buffer coordinates of a buffer region based on the disaster area coordinates. The method further describes a vehicle circle based on a radius of at least one location coordinate of the mobile vehicle and compares the vehicle circle with the buffer region coordinates. The disaster area coordinates are compared with the vehicle circle. The method then deploys at least one disaster alert based on the comparison of the vehicle circle and buffer region coordinates and disaster area coordinates.

Another aspect of the invention provides a system for deploying disaster alerts to a mobile vehicle. The system includes means for determining disaster area coordinates of a disaster area and means for calculating buffer coordinates of a buffer region based on the disaster area coordinates. The system further includes means for describing a vehicle circle based on a radius of at least one location coordinate of the mobile vehicle and means for comparing the vehicle circle with the buffer region coordinates. The system further includes means for comparing the disaster area coordinates with the vehicle circle. The system further includes means for deploying at least one disaster alert based on the comparison of the vehicle circle and buffer region coordinates and disaster area coordinates.

Another aspect of the invention provides a computer usable medium including computer program code for deploying disaster alerts to a mobile vehicle. The medium includes computer program code for determining disaster area coordinates of a disaster area and computer program code for calculating buffer coordinates of a buffer region based on the disaster area coordinates. The medium further includes computer program code for describing a vehicle circle based on a radius of at least one location coordinate of the mobile vehicle and computer program code for comparing the vehicle circle with the buffer region coordinates. The medium further includes computer program code for comparing the disaster area coordinates with the vehicle circle. The medium further includes computer program code for deploying at least one disaster alert based on the comparison of the vehicle circle and buffer region coordinates and disaster area coordinates.

The aforementioned and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
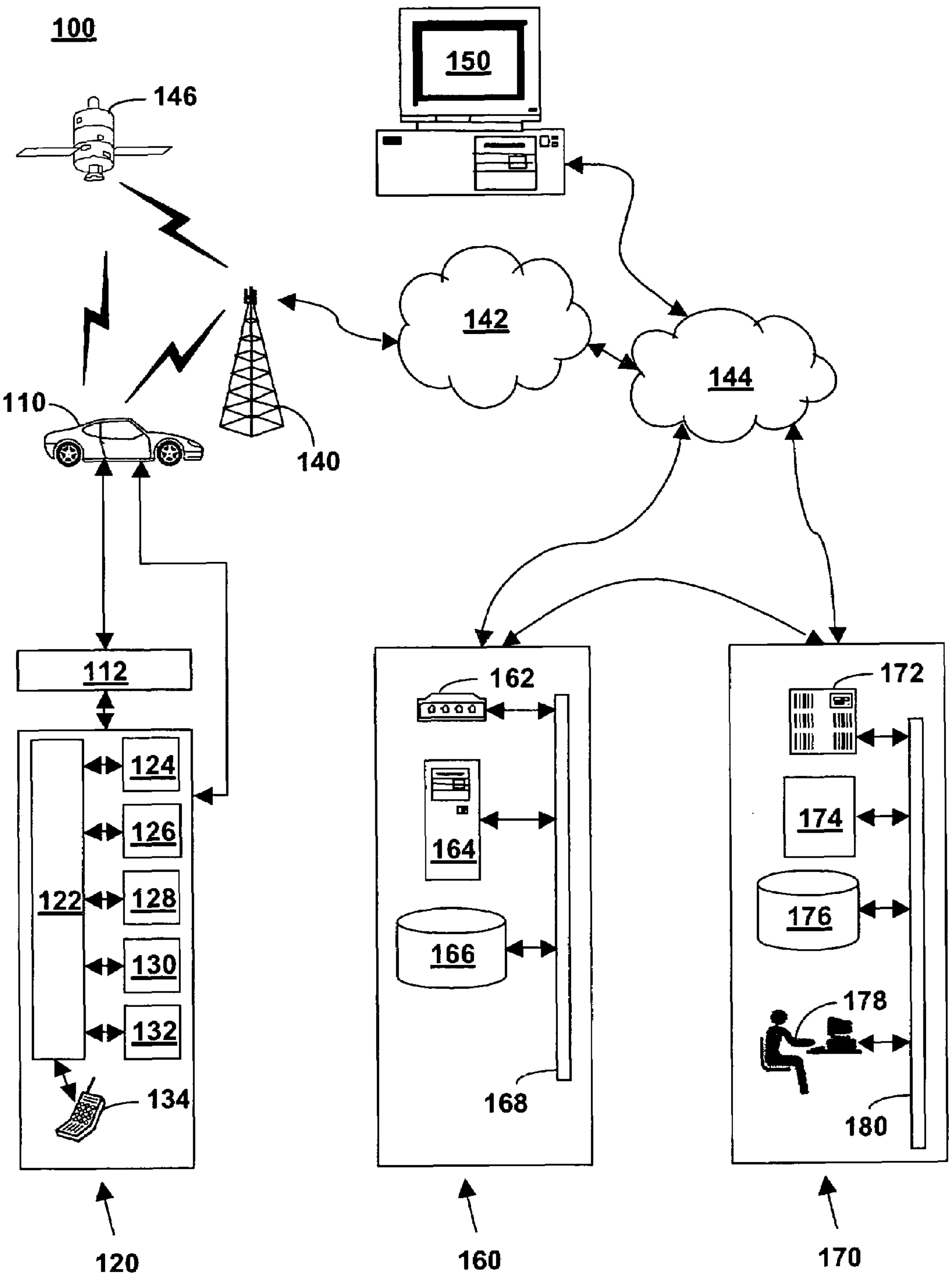
FIG. 1 illustrates a system for deploying disaster alerts in a mobile vehicle communication system, in accordance with one embodiment of the current invention.

FIG. 1 illustrates one embodiment of a mobile vehicle communication system (MVCS) 100 for deploying disaster alerts. MVCS 100 includes a mobile vehicle communication unit (MVCU) 110, a vehicle communication network 112, a telematics unit 120, one or more wireless carrier systems 140, one or more communication networks 142, one or more land networks 144, one or more satellite broadcast systems 146, one or more client, personal, or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 could include additional components not relevant to the present discussion. Mobile vehicle communication systems and telematics units are known in the art.

MVCU 110 is also referred to as a mobile vehicle in the discussion below. In operation, mobile vehicle 110 could be implemented as a motor vehicle, a marine vehicle, or as an aircraft. Mobile vehicle 110 could include additional components not relevant to the present discussion.

Vehicle communication network 112 sends signals to various units of equipment and systems within vehicle 110 to perform various functions such as monitoring the operational state of vehicle systems, collecting and storing data from the vehicle systems, providing instructions, data and programs to various vehicle systems, and calling from telematics unit 120. In facilitating interactions among the various communication and electronic modules, vehicle communication network 112 utilizes interfaces such as controller-area network (CAN), Media Oriented System Transport (MOST), Local Interconnect Network (LIN), Ethernet (10 base T, 100 base T), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication network 112 is a direct connection between connected devices.

Mobile vehicle 110, via telematics unit 120, sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 is implemented without one or more of the above listed components such as, for example, speakers 132. Telematics unit 120 could include additional components not relevant to the present discussion. Telematics unit 120 is one example of a vehicle module.

In one embodiment, processor 122 is implemented as a microcontroller, controller, host processor, or vehicle communications processor. In one embodiment, processor 122 is a digital signal processor. In another embodiment, processor 122 is implemented as an application-specific integrated circuit. In another embodiment, processor 122 is implemented as a processor working in conjunction with a central processing unit performing the function of a general-purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode, or multi-band cellular phone.

Processor 122 executes various computer programs that control programming and operational modes of electronic and mechanical systems within mobile vehicle 110. Processor 122 controls communications (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and vehicle communication network 112 that is connected to various electronic modules in the vehicle. In one embodiment, these digital signals activate programming modes and operation modes, as well as provide for data transfers such as, for example, data over voice channel communication. Signals from processor 122 could be translated into voice messages and sent out through speaker 132.

Wireless carrier system 140 is a wireless communications carrier or a mobile telephone system and transmits to and receives signals from one or more mobile vehicle 110. Wireless carrier system 140 incorporates any type of telecommunications in which electromagnetic waves carry signals over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to mobile vehicle 110. In one example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within mobile vehicle 110. In one embodiment, satellite broadcast system 146 broadcasts over a spectrum in the "S" band of 2.3 GHz that has been allocated by the U.S. Federal Communications Commission for nationwide broadcasting of satellite-based Digital Audio Radio Service (SDARS).

In operation, broadcast services provided by satellite broadcast system 146 are received by telematics unit 120 located within mobile vehicle 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In an example, processor 122 implements data packets received by telematics unit 120.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to mobile vehicle 110 and land network 144.

Land network 144 connects communication network 142 to computer 150, web-hosting portal 160, and call center 170. In one embodiment, land network 144 is a public-switched telephone network. In another embodiment, land network 144 is implemented as an Internet protocol (IP) network. In other embodiments, land network 144 is implemented as a wired network, an optical network, a fiber network, a wireless network, or a combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Computer 150 sends user preferences to web-hosting portal 160 through a web-page interface using communication standards such as hypertext transport protocol, or transport-control protocol and Internet protocol. In one embodiment, the data includes directives to change certain programming and operational modes of electronic and mechanical systems within mobile vehicle 110.

In operation, a client utilizes computer 150 to initiate setting or re-setting of user preferences for mobile vehicle 110. User-preference data from client-side software is transmitted to server-side software of web-hosting portal 160. In an example, user-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from data modem 162, data that is then transferred to web server 164. Data modem 162 could reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in mobile vehicle 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations, preferred hold-time content, and theft alarm settings. For each client, the web server potentially stores hundreds of preferences for wireless vehicle communication, networking, maintenance, and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one example, the call center is a telematics call center, facilitating communications to and from telematics unit 120 in mobile vehicle 110. In another example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in mobile vehicle 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in mobile vehicle 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services including initiating data over voice channel wireless communication, enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data such as, for example, primary diagnostic script to telematics unit 120 in mobile vehicle 110 through wireless carrier system 140, communication network 142, land network 144, voice and data switch 172, and network system 180. Communication services manager 174 stores or retrieves data and information from communication services database 176. Communication services manager 174 provides requested information to communication services advisor 178. The communications service manager 174 contains one or more analog or digital modems, in one embodiment.

In one embodiment, communication services advisor 178 is implemented as a real advisor. In an example, a real advisor is a human being in verbal communication with a user or subscriber (e.g., a client) in mobile vehicle 110 via telematics unit 120. In another embodiment, communication services advisor 178 is implemented as a virtual advisor/automaton. For example, a virtual advisor is implemented as a synthesized voice interface responding to requests from telematics unit 120 in mobile vehicle 110.

Communication services advisor 178 provides services to telematics unit 120 in mobile vehicle 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. In one embodiment of the invention, communications services advisor 178 provides hold-time content to the user according to the method of the present invention. Communication services advisor 178 communicates with telematics unit 120 in mobile vehicle 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140, and satellite broadcast system 146. In this embodiment, an inbound communication is routed to call center 170 from telematics unit 120 via wireless carrier system 140, communication network 142, and land network 144.

In accordance with one embodiment of the present invention, MVCS 100 serves as a system for deploying disaster alerts to one or more target vehicles. One or more mobile vehicles 110 register their locations with call center 170. These registered locations are stored, for example, at database 176. A signal is sent to call center 170 giving details, such as GPS coordinates, of a disaster region. Typically, this signal is sent by an independent government agency to call center 170. Call center 170 determines a buffer region surrounding the disaster region based on the GPS coordinates. Call center 170 then, using the method of the present invention, determines which vehicles within MVCS 100 are within the buffer region and/or the disaster region. Call center 170 then sends a disaster alert to these vehicles, for example via, telematics unit 120. Depending on the receiving vehicle(s) current location(s), telematics unit 120 plays the disaster alerts over output devices such as speaker 132 and visual display devices (not shown).

Computer program code containing suitable instructions to deploy disaster alerts reside in part at call center 170, Mobile vehicle 110, or telematics unit 120 or at any suitable component of these locations. For example, a program including computer program code to map the disaster region and/or determine the buffer region resides at call center 170 in one embodiment. Meanwhile, a program including computer program code to play the disaster alert at mobile vehicle 110 resides at telematics unit 120 or at the mobile phone 134 of telematics unit 120.

Figure 2:
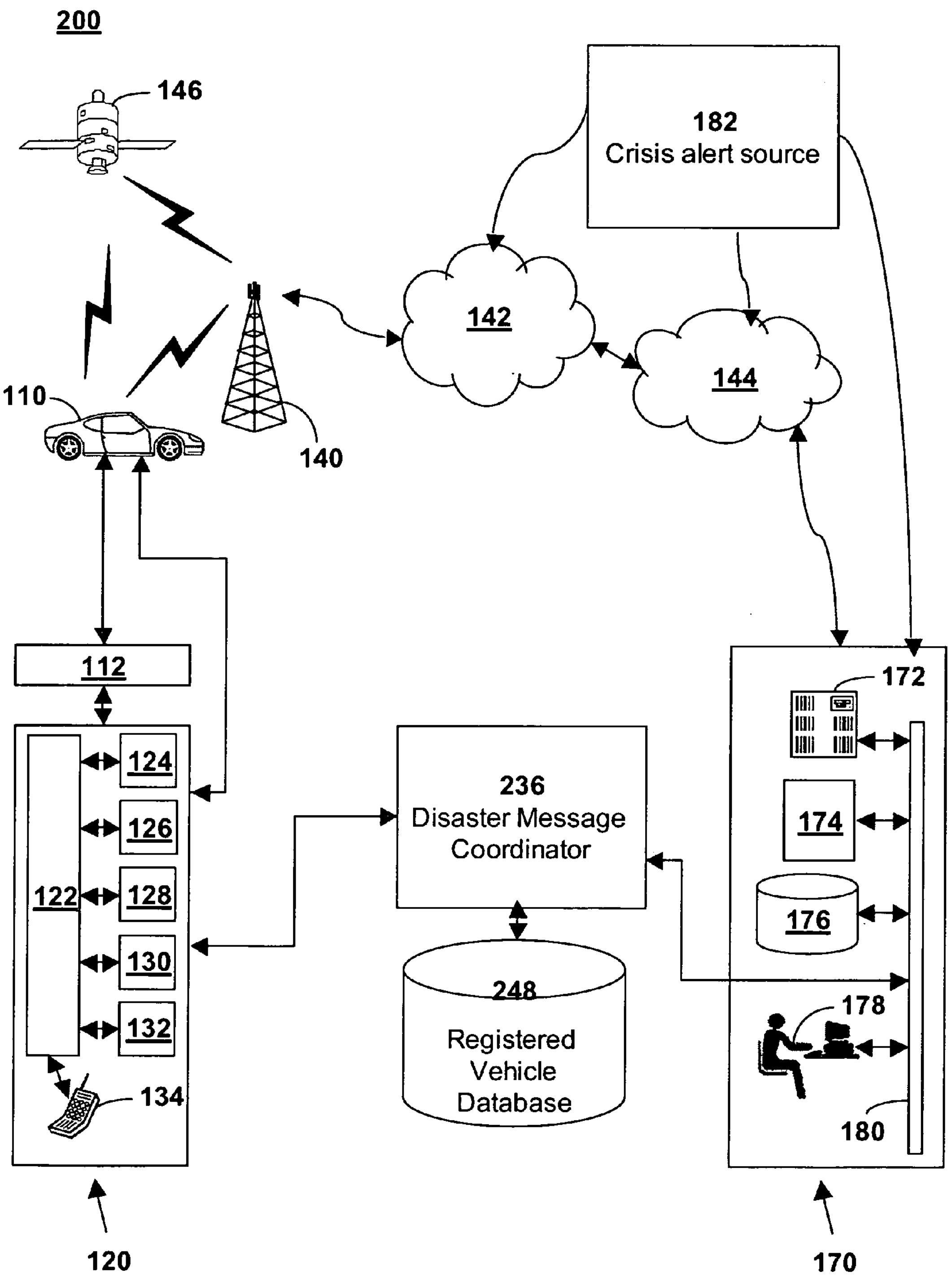
FIGS. 2, 2*a*, 2*b*, 2*c*, and 2*d* illustrate a system, an algorithm, a message structure, and data structure for deploying disaster alerts in a mobile vehicle communication system in accordance with another embodiment of the current invention.

FIG. 2 illustrates another embodiment of a mobile vehicle communication system (MVCS) 200 for deploying disaster alerts. In some embodiments of the invention, the components shown in FIG. 2 are also used in conjunction with one or more of the components of mobile vehicle communication system 100, above.

System 200 includes a vehicle network 112, telematics unit 120, and call center 170 as well as one or more of their separate components, as described above with reference to FIG. 1. System 200 further comprises a disaster message coordinator 236 and a registered vehicle database 248. In the embodiment of FIG. 2, disaster message coordinator 236 and registered vehicle database 248 could be a dedicated, separate system for managing disaster alerts, housed, for example, in a different area from call center 170.

Disaster message coordinator 236 is any suitable hardware and software capable of receiving disaster area alerts, calculating buffer regions from these alerts, transmitting these alerts and/or playing disaster alerts at telematics unit 120.

Disaster alerts emanate from one or more disaster alert sources 182. Example disaster alert sources include the National Oceanic and Atmospheric Administration (NOAA), the Department of Homeland Security, the United States Geographical Survey (USGS), and local agencies, among others. In one embodiment, the disaster alert source 182 communicates with communication network 142. In another embodiment, the disaster alert source 182 communicates with land network 144. In yet another embodiment, the disaster alert source is in direct communication with the call center 170.

In one embodiment, the received alert contains the topological coordinates describing a bounded geometric area encompassing the disaster. Example bounded geometric areas include an irregular polygon, regular polygon, rectangle, square, triangle, a point with a radius, and the like. The area calculation for the bounded geometric configurations, such as, for example, a rectangle may be provided by the entity providing the disaster information or may be calculated locally at the call center 170. In one embodiment, a multiplier representing a distance is applied to each line segment in a linear geometric configuration, such as, for example a square or irregular polygon. In another embodiment, a multiplier representing a distance is applied to a radius, providing a larger circumference representing a buffer region around a circular disaster alert area.

Communication services manager 174 sends to or receives from one or more communication services databases 176 data transmissions via network system 180. Disaster message coordinator 236 could be in communication with call center 170 for example over network system 180. In one embodiment, all or part of disaster message coordinator 236 is embedded within telematics unit 120.

Registered vehicle database 248 is any suitable database for storing information about vehicles that have registered with call center 170. For example, registered vehicle database 248 stores the registered location of a vehicle in the form of GPS coordinates of the vehicle and the time when the vehicle reported in with those coordinates.

Figure 2A:
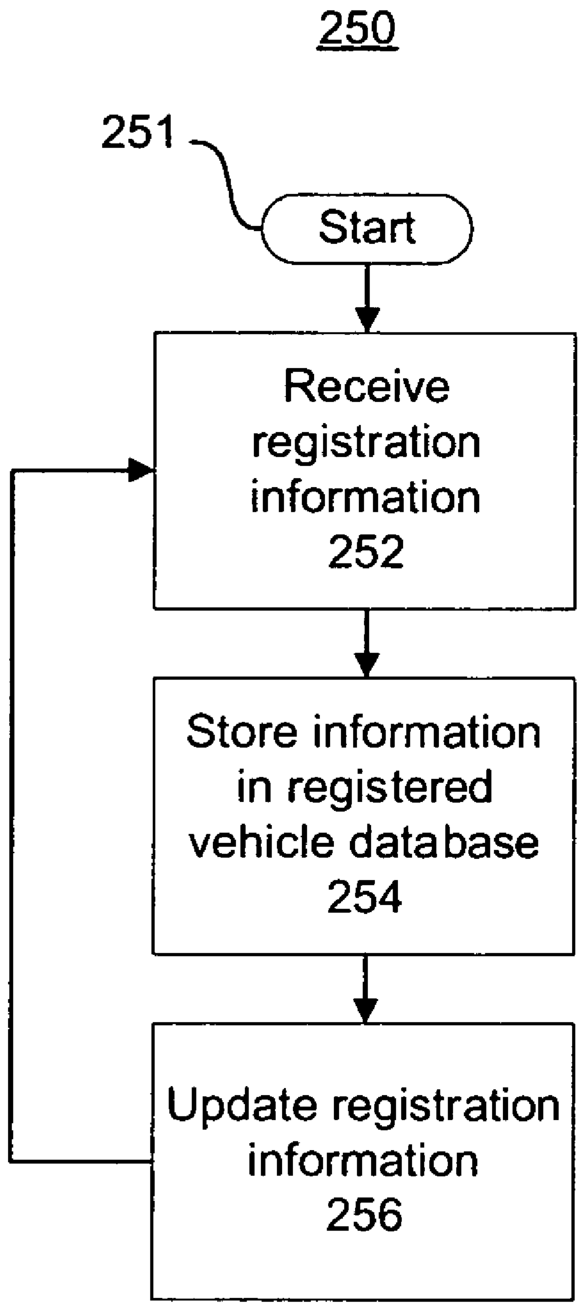

FIG. 2*a* illustrates one embodiment of a method 250 for updating the registered vehicle database in accordance with one embodiment of the current invention. The method steps begin at 251.

In step 252, registration information is received from vehicle 110. For example, registration information may be provided from vehicle 110 via Session Initiation Protocol (SIP). Communications manager 174 may accommodate a SIP registrar, well known in the art, which accepts registration requests from vehicle 110. In another embodiment, the SIP registrar is located in the Disaster Message Coordinator 236. In yet another embodiment, the SIP registrar is located within the communications network 142.

As seen in step 254, the received registration information is stored in the Registered Vehicle Database 248 for further processing.

As seen in step 256, registration information is updated. If registration information already exists for the vehicle 110, then the existing information is overwritten. If registration information does not exist for vehicle 110, a new record is created to accommodate the new registration information. Upon completion of creating or overwriting registration information records, the method returns to step 252.

Figure 2B:
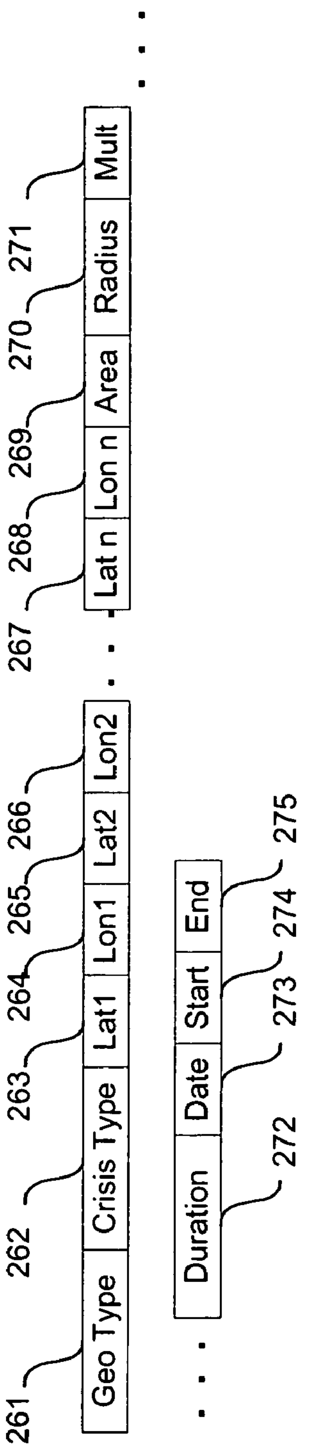
Figure 2C:
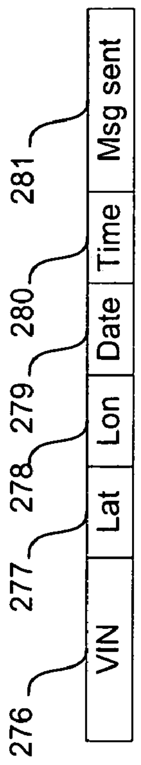

FIGS. 2*b* and 2*c* illustrate a data structure 260 for containing vehicle registration data in accordance with one embodiment of the current invention.

In one embodiment, two distinct record types are utilized for populating the registered vehicle database 248. The first record type, illustrated in FIG. 2*b*, begins with a geometric type field 261. A record beginning with a geometric type 261 receives data from a source providing disaster alert data. A record beginning with a vehicle identification number (VIN) 276 receives data from vehicle 110.

A geometric type providing a bound around a disaster area is provided at 261. Example geometric types include an irregular polygon, regular polygon, rectangle, square, triangle, a point with a radius, and the like. Latitude and longitude coordinates are provided in fields 263 through 268. Geometric types, in one embodiment, are described by an integer within the geometric type 261 field. For example, zero describes a circle and one describes a rectangle. In this embodiment, latitude and longitude coordinates are associated with the geometric type 261 field. For example, if the geometric type is a parallelogram, then four sets of latitude and longitude coordinates are required to bound the rectangle. If the geometric type is a circle, then one set of latitude and longitude coordinates are required to provide a center or "ground zero" value of the disaster area bounded by the circle.

Field 262 provides information regarding the type or disaster or disaster identifier. In one embodiment the disaster type includes a tornado, indicated by a binary one, a hurricane indicated by a binary two, or an earthquake indicated by a binary three.

Field 269 provides an area value if the geometric descriptor is a rectangle, triangle, irregular polygon or any linear or partially linear geometric configuration. In one embodiment, the area value is provided by the source of the disaster information. In another embodiment, the disaster message coordinator 236 calculates the area value.

Field 270 provides a radius value if the geometric descriptor is a circle. In one embodiment, the radius value is provided by the source of the disaster information. In another embodiment, the disaster message coordinator 236 calculates the radius value.

Field 271 provides the radius or linear multiplier applied to each line segment in a geometric configuration use to calculate the buffer region around the disaster alert area. In one embodiment the multiplier is provided by the call center 170. In another embodiment the multiplier is a default value resident within the disaster message coordinator 236.

Field 272 provides the duration of the disaster, if known. In one embodiment, the value in the duration field is in hour units. In another embodiment, the duration field is in day units. Field 273 provides the date the disaster alert was generated. Fields 273, 274 and 275 provide a disaster start date, start time and duration, respectively. For example, if a tornado warning was generated on Apr. $10^{th}$, 2004 at 6:00 pm EST and was rescinded at 8:00 pm EST, a representation of the start date is placed in the date 273 field, 6:00 pm EST is placed in the start time 274 field and a representation of 2 hours is placed in the duration field 275.

As illustrated in FIG. 2*c*, a vehicle 110 attempting to register with the call center 170 provides fields 276 through 281. Field 276 contains the vehicle identification number (VIN), of the vehicle 110 that identifies and associates a specific vehicle with a user. Field 277 provides the current latitude of vehicle 110 at the time of registration. Field 278 provides the current longitude of vehicle 110 at the time of registration. Field 279 provides the date of the registration, and field 280 provides the time of the registration. Field 280, the message sent field, indicates whether a disaster alert message has already been sent to the vehicle 110. In one embodiment the message sent field 280 is initially marked with a binary zero before a message is sent, and a binary one after a message is sent to the vehicle 110.

Figure 2D:
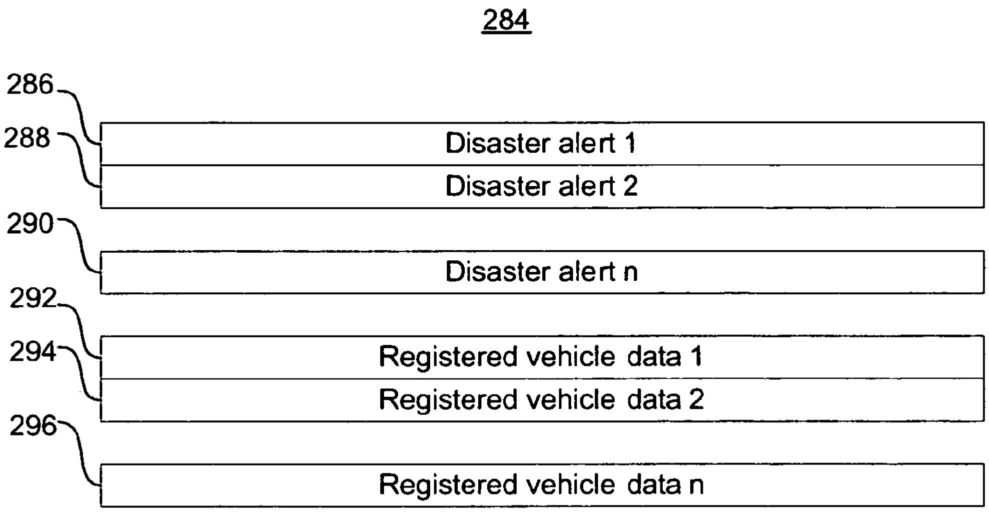

FIG. 2*d* provides a diagram of disaster alert and registered vehicle data records in accordance with an example of the present invention at 284.

Fields 286, 288 and 290 are records containing the disaster alert data fields specified in FIGS. 2*b* and 2*c*. In one embodiment one or more records representing one or more disaster alerts are contained within the registered vehicle database 248.

Fields 292, 294 and 296 are records containing the registered vehicle data fields specified in FIGS. 2*b* and 2*c*. In one embodiment one or more records representing one or more vehicles 110 are contained within the registered vehicle database 248.

Figure 3A:
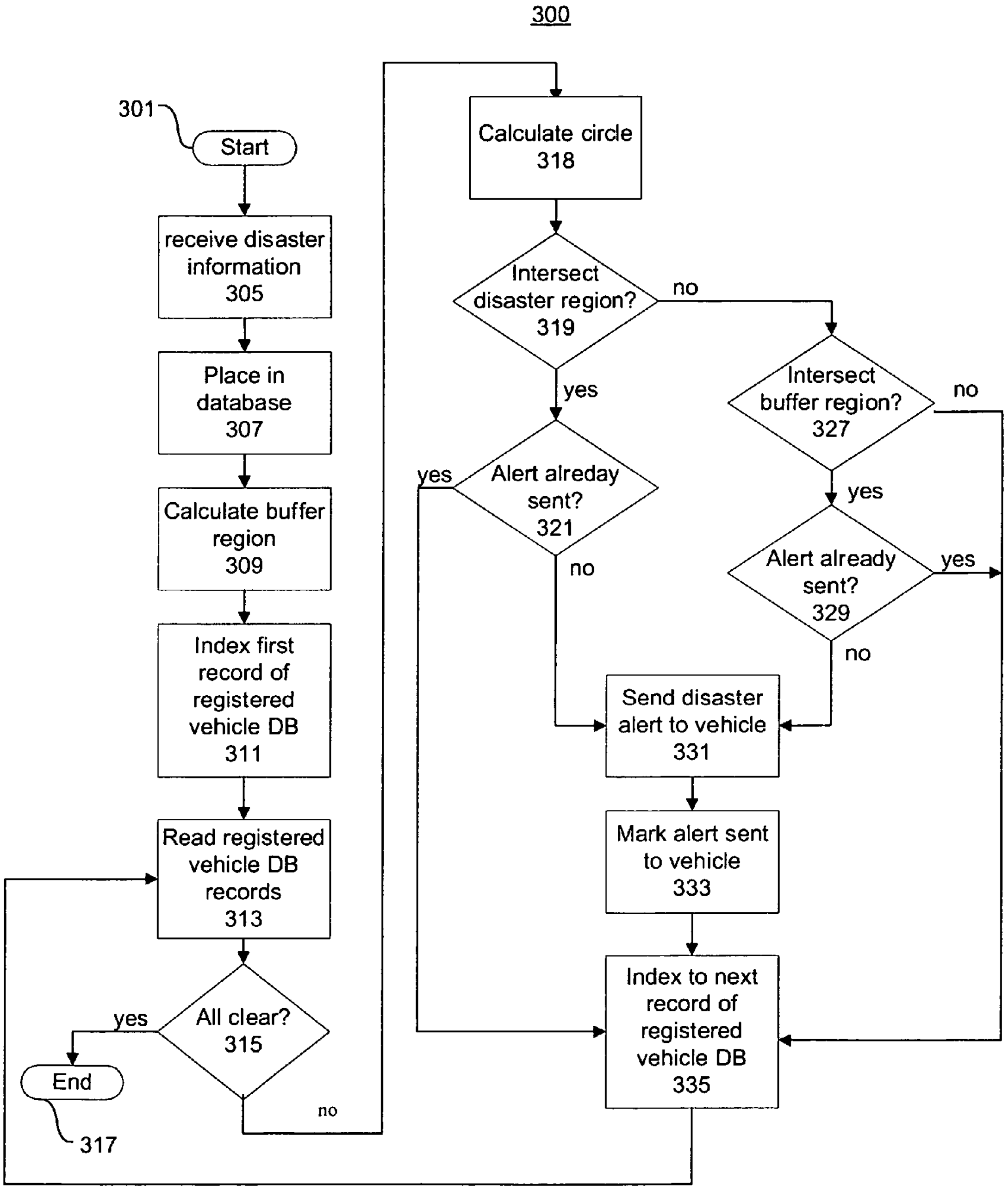
FIGS. 3*a*, 3*b*, and 3*c* illustrate a method for deploying disaster alerts in a mobile vehicle communication system, in accordance with one embodiment of the current invention.

FIG. 3*a* provides a flow chart 300 for an example of deploying disaster alerts in accordance with one embodiment of the current invention. Method steps begin at 301.

Although the steps described in method 300 are shown in a given order, the steps are not limited to the order illustrated. Moreover, not every step is required to accomplish the method of the present invention.

As seen at step 305, disaster information is received. In one embodiment, this signal is received by the call center 170. Disaster information is comprised of data describing disaster attributes. In one embodiment, disaster information includes a disaster type indication (e.g. hurricane, traffic accident, toxic cloud), a disaster center point or epicenter, and disaster travel speed and/or heading (if the disaster is a moving disaster such as, for example, a hurricane or tornado), temporal constraints, such as, for example, an indication of how long the disaster may be active, and/or a disaster diameter indicative of the geographic size of the disaster and other relevant information.

In step 307 the disaster information is deposited in a database for further processing. The database may be, for example, the communications services database 176. In another embodiment, the disaster information is deposited in the registered vehicle database 248.

As seen at block 309, coordinates are calculated designating the region to which the disaster information of block 305 applies. In one embodiment, these coordinates are determined at call center 170. Alternatively, these coordinates are calculated using disaster message coordinator 236. In one embodiment, a hypothetical line drawn to connect each of the calculated coordinates would describe the boundary of the disaster region.

As seen at block 311, the first record in the registered vehicle database in indexed, allowing the first record data to be accessed. Data fields may comprise, for example, vehicle identification number (VIN), the vehicle current location in latitude and longitude units, and the date and time the vehicle initially registered, the last date and time the vehicle registered, and whether a disaster alert message was sent to the vehicle.

As seen at block 313, registered vehicle database records are read. In one embodiment, a computer program running in the disaster message coordinator 236 reads the records. In another embodiment, a computer program running in the communications service manager 174 within call center 170 reads the records. The method then advances to step 315.

Step 315 determines whether an "all clear" or disaster cancellation notification is received. If an all clear or disaster cancellation notification is received, then the method steps are terminated at step 317. If an all clear of disaster cancellation notification is not received, the method advances to step 318.

Step 318 calculates a circle based on the location radius value provided for the vehicle 110. The location radius is used to define a perimeter around the last registered vehicle 110 location. In one embodiment, a default radius value is preprogrammed in the telematics unit 120 memory 128. For example, a default radius value may be thirty miles. In one embodiment, the circle is inscribed by sweeping the radius from zero to three hundred and sixty degrees, thus defining the circumference and perimeter of the circle.

Step 319 determines whether a portion of the area of the circle defined by the location radius intersects with a disaster region. If the circle intersects with a disaster region, then the method advances to step 321. If the circle does not intersect with a disaster region, then the method advances to step 327.

Step 321 determines whether an alert message has already been sent to the vehicle 110. In one embodiment, the message sent field 279 content is examined for a binary one or binary zero value (i.e. logical true/false). If the message sent field 279 contains a binary one, then a message has been sent to the vehicle 110 and the method advances to step 333. If the field contains a binary zero, then a message has not been sent and the method advances to step 331.

As seen in step 331, a disaster alert message is sent to the vehicle 110. In one embodiment, the alert message is sent to the vehicle 110 as a text string and annunciated to the vehicle 110 occupants by text to speech algorithms running in processor 122 within the telematics unit 120. In another embodiment, the disaster alert message is a .wav, .aiff, .mp3 or the like file played over a vehicle radio or multimedia system. The method then advances to step 325.

If the circle does not intersect a disaster region, then step 327 determines whether the circle intersects with a disaster buffer region. If the circle intersects the disaster buffer region, the method advances to step 329, otherwise the method advances to step 333.

Step 329 determines whether an alert message has already been sent to the vehicle 110 that intersects a buffer region. In one embodiment the message sent field 279 content is examined for a binary one or binary zero value (i.e. logical true/false). If the message sent field 279 contains a binary one, then a message has been sent to the vehicle 110 and the method advances to step 333. If the field contains a binary zero, then a message has not been sent and the method advances to step 331.

Step 333 marks the alert sent to the vehicle. In one embodiment, a binary one overwrites the value stored in the message sent field 279. The method then advances to step 335.

As seen in step 335 the next record in the Registered Vehicle Database is indexed to and accessed. The method then returns to step 313.

FIG. **3*b* provides a flow chart 370 illustrating an example of deploying disaster alerts in accordance with one embodiment of the current invention. The method steps begin at 371**.

The vehicle 110 location is determined in step 372. In one embodiment the GPS unit 126 provides the vehicle location. In one embodiment the vehicle location information received by the GPS unit 126 is in a binary format. In another embodiment, the vehicle location information is in NMEA (National Marine Electronics Association) format. The vehicle location information may be stored in the telematics unit 120 memory 128 for further processing.

Step 374 determines whether the vehicle 110 location is within the disaster buffer region. In one embodiment, the location is determined in the telematics unit 120 by comparing the latitude and longitude of the current vehicle location with locations within the disaster buffer region. In another embodiment, the vehicle location is determined at the disaster message coordinator 236. In yet another embodiment, the vehicle 110 location is determined at the call center 170. If the vehicle 110 intersects the disaster buffer region, then the method advances to step 376. If the vehicle 110 does not intersect with the disaster buffer region, then the method returns to step 372.

Step 378 determines whether the vehicle 110 is within a disaster alert area by checking if vehicle 110 intersects a disaster region. In one embodiment, the intersection is determined in the telematics unit 120 by comparing the latitude and longitude of the current vehicle location with locations within the disaster region. In another embodiment the vehicle 110 and disaster region intersection is determined at the disaster message coordinator 236. In yet another embodiment, the vehicle 110 and disaster region intersection is determined at the call center 170.

If the vehicle 110 does not intersect with the disaster but still remains within the buffer region (determined at step 374), then the method continues to step 380 and a buffer alert message is played within the vehicle 110. In one embodiment, the buffer alert message is played over the speakers 132 associated with the telematics unit 120. In another embodiment, the buffer alert message is routed to the vehicle 110 entertainment system speakers (not shown). The method then returns to step 372.

If the vehicle 110 intersects the disaster region, then the method advances to step 382 and a disaster alert message is played. In one embodiment, the disaster alert message is stored in memory 128. The method returns to step 372.

FIG. **3*c* provides a flow chart 382 illustrating an example vehicle registration in accordance with one embodiment of the current invention. The method steps begin at 383**.

As seen in step 384, the vehicle 110 location is determined. In one embodiment the vehicle 110 location, in units of latitude and longitude, is provided by the GPS unit 126 located within the telematics unit 120. The method then advances to step 386. In step 386 the vehicle location is registered in the Registered Vehicle Database 248. In one embodiment, the vehicle location is uploaded from the vehicle 110 to the call center 170 and transferred to the registered vehicle database 248. After vehicle registration the method advances to step 390.

As seen in step 390, the latest registration location received is stored in the registered vehicle data field 292, 294, 296 associated with the registering vehicle 110. The method then advances to step 392.

As seen in step 392 the vehicle 110 location is re-determined. In this embodiment the vehicle location is re-determined in order to account for any new distance traveled from the last time the vehicle 110 registered with the registered vehicle database 248. The method then advances to step 394.

As seen at step 394, the distance between current vehicle location and the registration location is calculated. In one embodiment, distance traveled is determined via a Great Circle distance calculation. The Great Circle distance, d, takes the curvature of the earth into account and provides an accurate distance from one set of latitude and longitude values to another. In one embodiment the latitude and longitude values are first converted to radian units via the formula:

$$Radians=dd.dddd/57.3,$$

Where dd.dddd represents a latitude or longitude value.

For example, if the registered location in the registered vehicle database is denoted as Lat1 and Lon1, and the current vehicle location is Lat2 and Lon2, the latitude and longitude values are converted to radians and the Great Circle distance formula is utilized. The Great Circle distance is:

$$d=a\cos(\sin(Lat1)*\sin(Lat2)+\cos(Lat1)*\cos(Lat2)*\cos(Lon1-Lon2)).$$

In this embodiment the returned distance, d, is in radian units and may be converted to nautical miles, nm, using the formula:

$$nm=d*3427.7387.$$

In this embodiment the nautical mile value is converted into statute miles, mi, by:

$$mi=nm*1.150699.$$

In other embodiments, the distance value may be utilized in kilometers, meters, or feet. The method then advances to step 396.

As seen in step 396, a test is performed to determine whether the vehicle 110 is outside of the circle defined by the vehicle radius. In one embodiment the vehicle 110 performs a periodic test that examines the latitude and longitude values provided by the GPS unit 126 and compares the reading with coordinates defined by the radius value. For example, if an outermost latitude point is on the circumference of the circle defined by the radius value, such as N42 20.381, and the latitude value provided by the GPS unit 126 is N42 20.450, then the vehicle 110 is outside of the circle defined by the vehicle radius. If the vehicle is outside of the circle defined by the radius value, then the method returns to step 386. In another example, the Great Circle distance is calculated for the current vehicle position from the vehicle position registered in the registered vehicle database 248. If this distance is greater than the radius value, then the vehicle is outside the circle defined by the radius value and the method returns to step 386. If the vehicle is not outside of the circle defined by the radius value, then the method returns to step 392.

Figure 4:
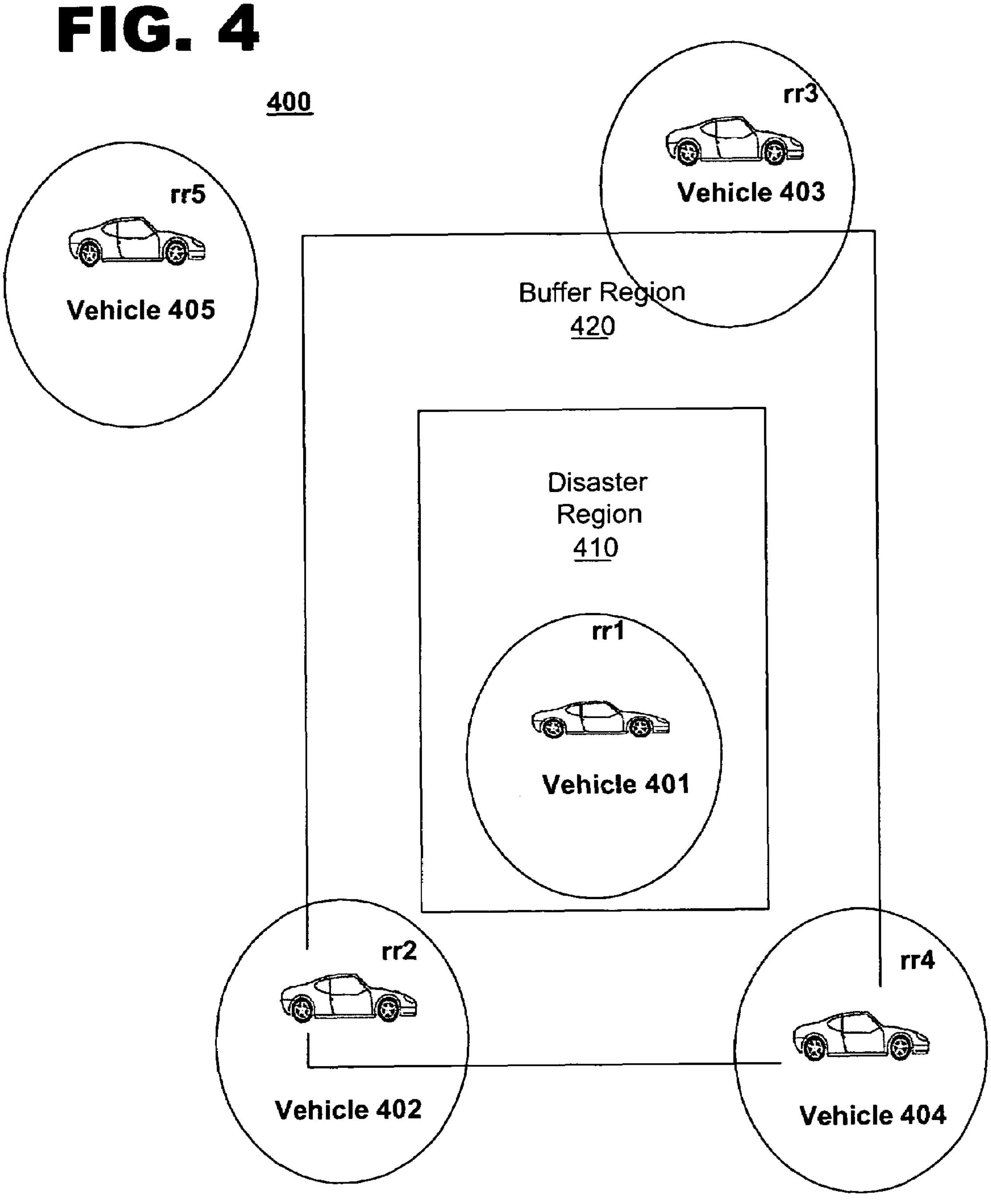
FIG. 4 illustrates one schematic for the method for deploying disaster alerts in a mobile vehicle communication system of FIG. 3.

FIG. 4 is a diagram illustrating the use of method 300 for deploying disaster alerts, in accordance with one embodiment of the current invention. Although five vehicles are shown in this illustration, the method is suited for both larger and smaller numbers of vehicles. FIG. 4 shows the registered locations of the five vehicles 401, 402, 403, 404, and 405.

The method of the present invention determines disaster region 410 as described in FIG. 3*a* above at steps 301 and 307.

Once disaster region 410 has been determined, a buffer region 420 is calculated as described above in FIG. 3*a* at step 309.

Figure 3B:
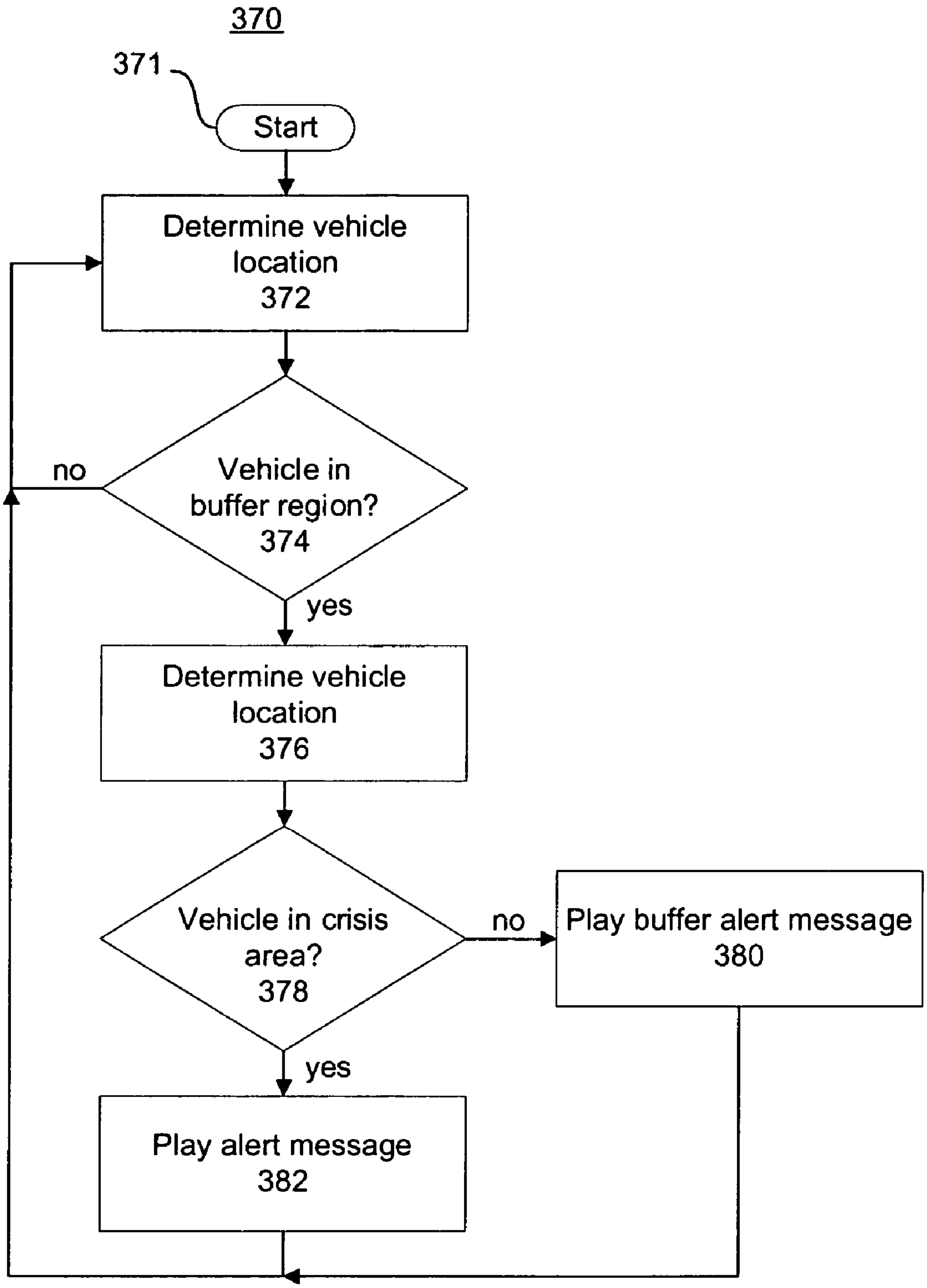
Figure 3C:
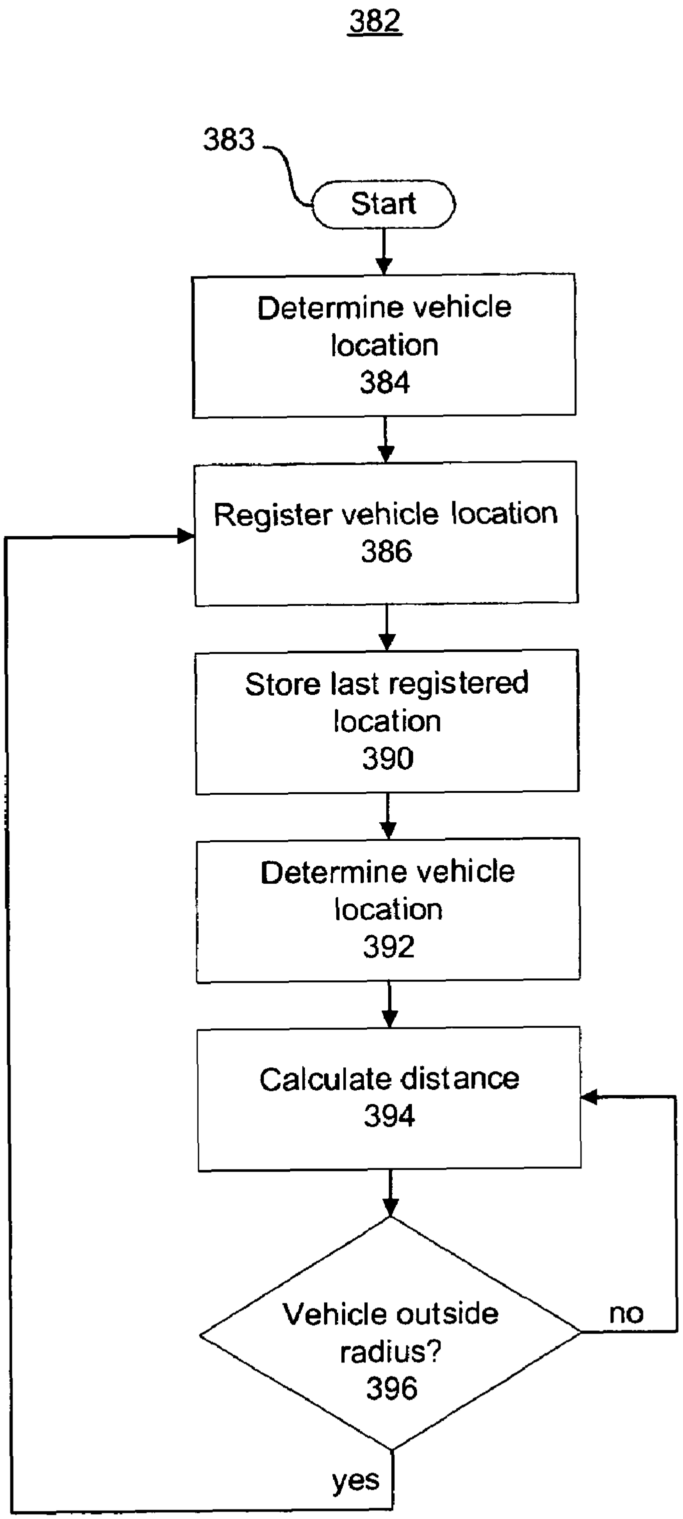

Once regions 410, 420 have been determined, the method of the present invention determines the registered locations of vehicles 401, 402, 403, 404, and 405, as discussed above in FIGS. 3*a* and 3*b*. The method then proceeds to determine the circles defined by the radii of the registered locations, In FIG. 4, these circles are labeled as rr1, rr2, rr3, rr4 and rr5. A circle is defined by the radius value of a given vehicle using the method described in FIG. 3*c*. For example, vehicle 401 has a circle rr1 determined from a radius value that was calculated from a registered location of vehicle 401.

The location of circles rr1, rr2, rr3, rr4 and rr5 in relation to buffer region 420 determines whether or not vehicles 401, 402, 403, 404, or 405 will receive an alert as follows:

Vehicle 401's circle rr1 intersects disaster region 410 and buffer region 420. A disaster alert will be sent to vehicle 401.

Vehicle 402's circle rr2 intersects buffer region 420. A buffer alert will be sent to vehicle 402.

Vehicle 403's circle rr3 intersects buffer region 420. A buffer alert will be sent to vehicle 403.

Vehicle 404's circle rr4 intersects buffer region 420. A buffer alert will be sent to vehicle 404.

Vehicle 405's circle rr5 is neither in disaster region 410 nor in buffer region 420. No alert will be sent to vehicle 405.

Figure 5:
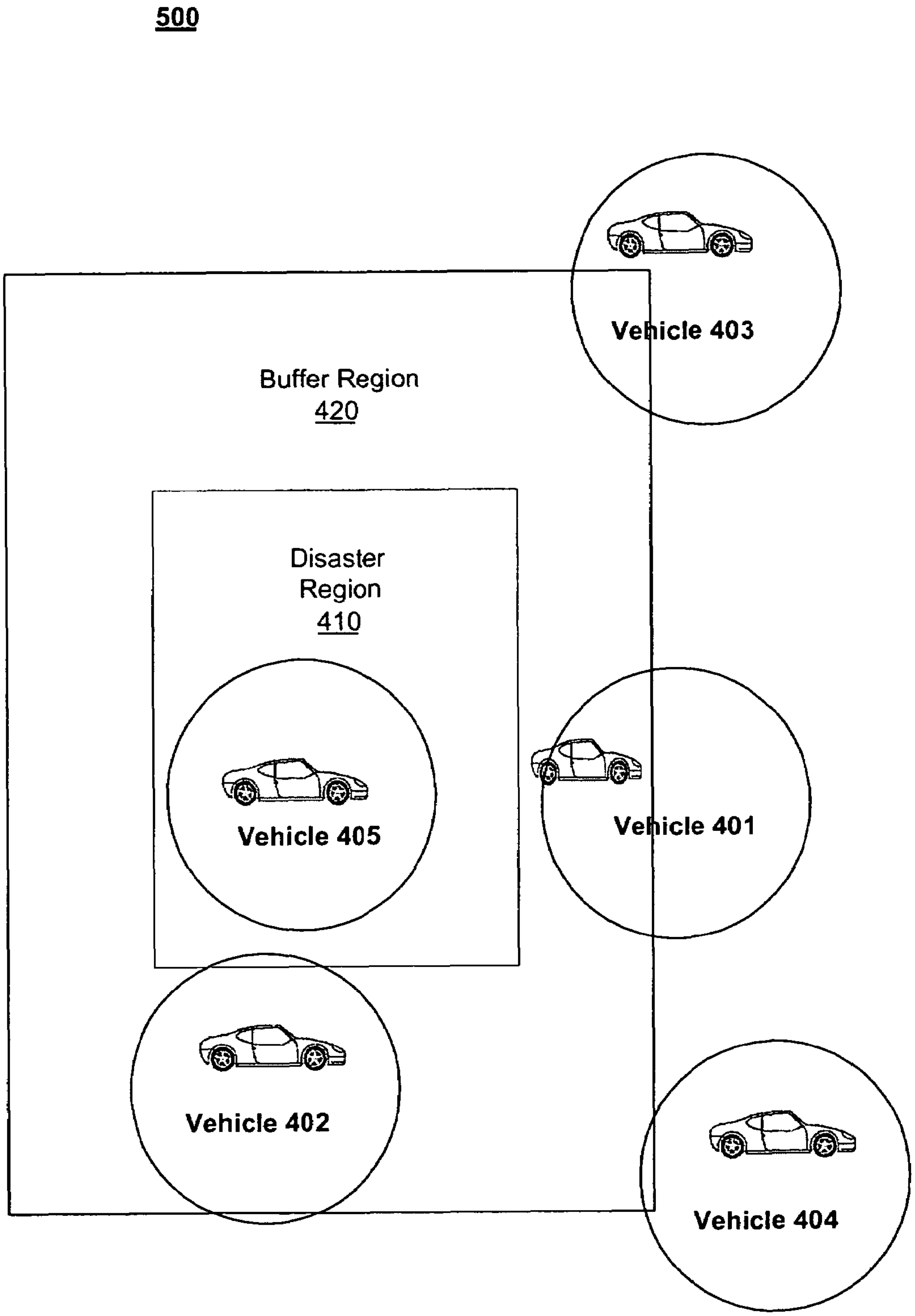
FIG. 5 illustrates another schematic for the method for deploying disaster alerts in a mobile vehicle communication system of FIG. 3.

FIG. 5 is a diagram illustrating the use of method 300 for deploying disaster alerts, in accordance with one embodiment of the current invention. These are the same five vehicles as those in FIG. 4 but they have moved since the time their registered locations were determined. Thus the actual locations of vehicles 401, 402, 403, 404, and 405 have now changed and must be determined as discussed above in FIG. 3*c*. Disaster region 410 and buffer region 420 remain determined as above.

Buffer circles for each vehicle were previously determined from the actual locations of the five vehicles. The locations of vehicles 401, 402, 403, 404, 405 in relation to buffer region 420 and disaster region 410 determine whether or not vehicles 401, 402, 403, 404, or 405 will play back the buffer alert message or disaster alert message, respectively. For example, vehicle 401 is within the buffer region 420, so that the buffer alert message will be played in vehicle 401. Conversely, vehicle 405 is within the disaster region 410 so that the disaster alert message will be played in vehicle 405.

Thus, when a circle intersects a buffer or disaster region, an alert is sent to the vehicle associated with that circle. Thereafter, in the even that the vehicle enters the buffer or disaster region, the alert is then played for the user in the vehicle.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of deploying disaster alerts to a mobile vehicle, comprising:

determining disaster area coordinates of a disaster area;

calculating buffer coordinates of a buffer region based on the disaster area coordinates;

describing a vehicle circle based on a radius of at least one location coordinate of the mobile vehicle;

comparing the vehicle circle with the buffer region coordinates;

comparing the vehicle circle with the disaster area coordinates; and deploying at least one disaster alert based on the comparison of the vehicle circle and buffer region coordinates and disaster area coordinates.

2. The method of claim 1, further comprising:

playing a buffer alert at the mobile vehicle in response to the location coordinate within the buffer region.

3. The method of claim 1 wherein deploying at least one disaster alert comprises playing a disaster alert at the mobile vehicle based on the location coordinate within the disaster region.

4. The method of claim 1 wherein comparing the vehicle circle with the buffer region coordinates comprises comparing a location coordinate of the mobile vehicle with at least one location coordinate within the buffer region.

5. The method of claim 1 wherein describing a vehicle circle based on a radius of at least one location coordinate of the mobile vehicle comprises:

receiving first registration information of the mobile vehicle;

storing the first registration information in a registered vehicle database; and determining the at least one location coordinate of the mobile vehicle from the first registration information.

6. The method of claim 5, further comprising:

indexing the first registration information of the mobile vehicle; and reading the first registration information of the mobile vehicle.

7. The method of claim 6, further comprising:

calculating a distance the mobile vehicle has traveled from the location coordinate; and determining second registration information of the mobile vehicle based on the calculated distance.

8. A system of deploying disaster alerts to a mobile vehicle, comprising:

means for determining disaster area coordinates of a disaster area;

means for calculating buffer coordinates of a buffer region based on the disaster area coordinates;

means for describing a vehicle circle based on a radius of at least one location coordinate of the mobile vehicle;

means for comparing the vehicle circle with the buffer region coordinates;

means for corn paring the vehicle circle with the disaster area coordinates; and means for deploying at least one disaster alert based on the comparison of the vehicle circle and buffer region coordinates and disaster area coordinates.

9. The system of claim 8, further comprising means for playing a buffer alert at the mobile vehicle when the location coordinate is within the buffer region.

10. The system of claim 8, further comprising means for playing a disaster alert at the mobile vehicle when the location coordinate is within the disaster region.

11. The system of claim 8, further comprising:

means for receiving first registration information of the mobile vehicle;

means for storing the first registration information in a registered vehicle database; and means for determining the at least one location coordinate of the mobile vehicle from the first registration information.

12. The system of claim 11, further comprising:

means for indexing the first registration information of the mobile vehicle; and means for reading the first registration information of the mobile vehicle.

13. The system of claim 12, further comprising:

means for calculating a distance the mobile vehicle has traveled from the location coordinate; and means for determining second registration information of the mobile vehicle.

14. A computer readable medium encoded with a program to deploy disaster alerts to a mobile vehicle, comprising:

computer program code that determines disaster area coordinates of a disaster area;

computer program code that calculates buffer coordinates of a buffer region based on the disaster area coordinates;

computer program code that describes a vehicle circle based on a radius of at least one location coordinate of the mobile vehicle;

computer program code that compares the vehicle circle with the buffer region coordinates;

computer program code that compares the vehicle circle with the disaster area coordinates; and computer program code for deploying at least one disaster alert based on the comparison of the vehicle circle and buffer region coordinates and disaster area coordinates.

15. The computer readable medium of claim 14, further comprising computer program code that plays a buffer alert at the mobile vehicle when the location coordinate is within the buffer region.

16. The computer readable medium of claim 14, further comprising computer program code that plays a disaster alert at the mobile vehicle when the location coordinate is within the disaster region.

17. The computer readable medium of claim 16, further comprising computer program code that compares a location coordinate of the mobile vehicle with at least one location coordinate within the buffer region.

18. The computer readable medium of claim 14, further comprising:

computer program code that receives first registration information of the mobile vehicle;

computer program code that stores the first registration information in a registered vehicle database; and computer program code that determines the at least one location coordinate of the mobile vehicle from the first registration information.

19. The computer readable medium of claim 18, further comprising:

computer program code that indexes the first registration information of the mobile vehicle; and computer program code that reads the first registration information of the mobile vehicle.

20. The computer readable medium of claim 19, further comprising:

computer program code that calculates a distance the mobile vehicle has traveled from the location coordinate; and computer program code that determines second registration information of the mobile vehicle.

* * * * *